Dec. 5, 1967 R. S. BRADFORD ET AL 3,356,921
MOTOR CONTROL CIRCUIT WITH COMPENSATION
FOR DROPOUT OF CONTROL SIGNALS
Filed April 24, 1964

INVENTORS:
Robert S. Bradford
Paul D. Leeke
By Smyth, Roston & Pavitt
Attorneys

United States Patent Office 3,356,921
Patented Dec. 5, 1967

3,356,921
MOTOR CONTROL CIRCUIT WITH COMPENSATION FOR DROPOUT OF CONTROL SIGNALS
Robert S. Bradford, Tarzana, and Paul D. Leeke, Ventura, Calif., assignors to Minnesota Mining and Manufacturing Company, St. Paul, Minn.
Filed Apr. 24, 1964, Ser. No. 362,281
22 Claims. (Cl. 318—318)

ABSTRACT OF THE DISCLOSURE

A magnetic tape is driven by a motor which in turn is controlled by comparing the phase of a reference pulse source with the phase of clock pulses as reproduced from the tape. The occurrence of tape clock pulses is continuously monitored. During a dropout the motor is controlled in accordance with control signals established prior to the dropout.

Figure 1:
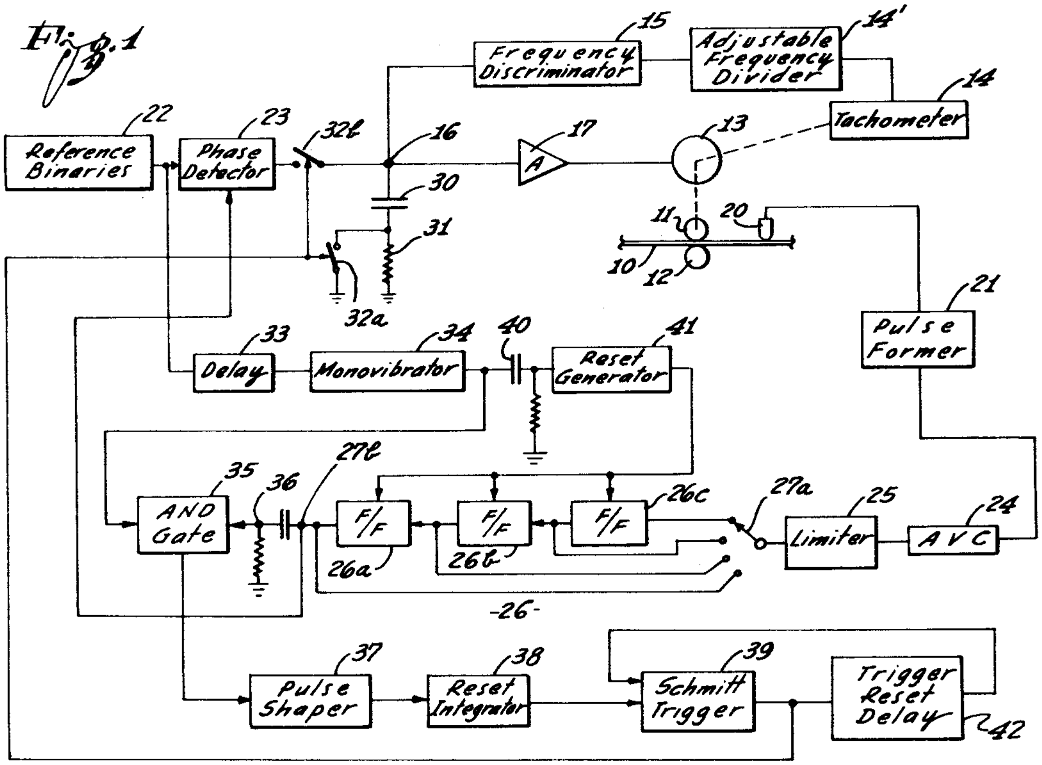

The present invention relates to control systems for motors driving recording tapes.

More particularly, the invention relates to improvements in the control of a tape-drive mechanism which includes a motor, particularly an electric motor, for driving a tape on which data are stored, and includes a control track on which tape clock pulses are recorded for synchronizing the retrieval of such data with evaluating processes.

One of the problems repeatedly observed is that the control track on a tape sometimes vanishes for brief periods. For example, the most frequent observation is that one or two recorded tape clock pulses are missing. The speed of the motor transporting the tape has to be controlled towards a speed in which the frequency of occurrence of tape clock pulses is in synchronism with the frequency of a local oscillator furnishing reference clock pulses. Moreover, the tape clock or synchronization pulses have to be phase-locked to the local oscillator, so that the motor has to be position controlled. The missing of one or of several tape clock pulses tends to influence the control network disadvantageously, so that it is possible for a data count to be missed. It will be observed that a count once missed cannot be restored, and it will be further observed that in case such a tape clock pulse dropout occurs repeatedly, there is an accumulation of error and of missed counts.

It is, therefore, a primary object of the present invention to improve the tape-transport mechanism in such a manner that a tape clock-pulse dropout can be detected immediately upon its occurrence and that effective steps can be taken to prevent erratic operation of the control network during dropout and to obtain continuous, proper readout operation—which does not necessitate a stopping and restarting of the tape mechanism, yet insures that not a single count is being missed.

It is, therefore, an object of the present invention to provide a network permitting recognition of the occurrence of any dropout of tape clock pulses and to "bridge" such a dropout so as to continue, for a certain period of time, tape-data readout operation without endangering the accuracy of the data readout.

It is a further object of the present invention to improve phase and position control of feed-back-controlled motors running in synchronism with a local clock-pulse source.

According to one aspect of the present invention in a preferred embodiment thereof, the invention uses a tape-driving motor, for which there is provided a speed-control network including a frequency-stabilizing circuit, so that the speed of the motor is maintained constant by way of frequency measurement and frequency discrimination. Additionally, the tape-driving motor is controlled by a phase-sensitive network, in which the phase of a train of tape binaries representing the read out tape clock pulses is compared with the phase of reference binaries produced by a clock-pulse source. The amplifier controlling the motor that drives the tape is controlled, on its input side, by the output of both the frequency discriminator and the phase detector, receiving their respective signals as aforedescribed for normal speed control of the motor and for position control of the tape. In addition, sensing means are provided for determining the average potential at the input side of the above-mentioned amplifier. This average potential is indicative of the average voltage that is necessary to keep the speed of the motor constant during certain periods of time when speed and position are being maintained within very accurate limits.

It is a principal feature of the present invention that the dropout of tape clock pulses or tape binaries is detected immediately upon occurrence thereof and that, after dropout, the motor amplifier is temporarily controlled strictly in accordance with the potential previously averaged by the sensing means monitoring the input of the amplifier during regular operation.

Tape-binary dropout is determined in continuously monitoring the coincidence of such a reference binary and of a corresponding binary within a tolerance interval established periodically. Lack of coincidence, due, for example, to a tape-binary dropout, results in a control signal which arrests the motor amplifier input potential to that which was previously established by the averaging and sensing means.

It is a further feature of the invention to use a particular frequency—for example, that of the clock-pulse source furnishing the reference binaries—for the control of the entire network. In case the tape is being driven at different selected speeds, the tape clock pulses monitored are fed to a counter or frequency divider furnishing an output signal (tape binary) of a frequency always comparable with the frequency of the reference binaries. This counter or frequency-divider output is used directly in the phase detector of the above-mentioned position control. In addition, the output is used for determining the coincidence and existence of tape and reference binaries so as to control the input side of the motor amplifier during the dropout period. The counter or frequency divider is being reset by a signal developed in synchronism and drawn directly from the source of reference binaries.

It is a further feature of the present invention to continuously monitor the coincidence of reference binaries and tape binaries and to determine whether the time that has elapsed between the respective last proper coincidence exceeds a predetermined value, which value is being established in the form of a trigger voltage level. Whenever such excess time is being monitored, a control signal is produced to arrest the input voltage for the tape motor to the value previously monitored by the sensing and averaging means, such as an RC circuit.

While the specification concludes with claims particularly pointing out and distinctly claiming the subject matter which is regarded as the invention, it is believed that the invention, the objects and features of the invention, and further objects, features, and advantages thereof will be better understood from the following description taken in connection with the accompanying drawings, in which:

FIG. 1 illustrates a block diagram of the preferred embodiment of the invention; and FIGS. 2*a* through 2*g* illustrate pulse diagrams of various pulses produced by and in the system shown in FIG. 1.

Proceeding now to the detailed description of the drawings, FIG. 1 illustrates a tape-binary dropout detecting and "bridging" system. Somewhat schematically there is shown a magnetic tape 10 driven by a capstan 11 in cooperation with an idler 12. The capstan 11 is driven by a D.C. motor 13. The principal features of the invention revolve about the control of this motor 13, and all inventive measures have as their ultimate goal the improvement of the degree of regularity of control of this motor 13.

The capstan 11 is geared to or seated onto the output shaft of motor 13. A tachometer 14 is mounted on the driving shaft of motor 13, and it produces an A.C. output signal, the frequency of which is directly proportional to the speed of motor 13.

The tachometer 14 may be comprised of a disk bearing optical-contrast producing markers that are scanned by a photoelectric detector. The disk is secured to the motor shaft. The output of such a detector is a train of pulses having a frequency strictly proportional to the speed of motor 13.

Tape-transport mechanisms usually are designed to operate at different tape speeds. Conventional tape speeds are 7½ inches per second, 15 inches per second, 30 inches per second, and 60 inches per second, eventually also including 120 inches per second. It is advisable, however, to attune and to run the control circuit for motor 13 at one particular frequency which corresponds to only one of those speeds. The input of the control network is then adjusted upon a variation of the desired tape speed, so that for any different speed the control circuit operates at the same frequency. In the present case, the inventive embodiment is explained with reference to an operating frequency in the control circuit of 12.5 kilocycles per second.

Thus, the output signals of tachometer 14 are applied to a binary chain 14', i.e., a pulse-frequency divider with adjustable output. For every different motor and tape speed, the frequency divider 14' is readjusted to always furnish output signals at the frequency of 12.5 kilocycles per second.

The speed of motor 13 is maintained at a constant level by feedback control. The control loop includes, aside from tachometer 14 and frequency divider 14', a frequency discriminator 15 having as its input the A.C. output furnished by frequency divider 14'. Discriminator 15 is of a known type, for example, one that has an adjustable D.C. bias for adjusting the output of discriminator 15 to zero at the desired motor speed.

The D.C. output of discriminator 15 is fed to a junction or control terminal 16 which is connected to the input side of an amplifier 17. The D.C. bias level established at junction or control terminal 16 by several means that are more fully explained below will drive the amplifier 17. The output signal of this D.C. amplifier 17 is used to run and to control the motor 13 at the desired speed and phase.

The elements described thus far establish a first feedback loop designed to run motor 13 at a constant speed.

The ultimate purpose of the speed control for motor 13 is to establish synchronism between the information content which is stored in tape 10 and which is being read therefrom for evaluation. Accordingly, it is not only necessary to run the tape at a particular speed, but also to keep constant an accurate phase relationship between the tape and a reference signal in the evaluating network. Such phase-lock control is carried out as follows:

Reference numeral 20 designates the readout head, for example, a magnetic head, which by interaction with tape 10 furnishes an electrical output signal representative of the data stored in tape 10. For purposes of the present invention, it is only important that this head 20 should also read out the tape clock and synchronization pulses of the control track as originally recorded on tape 10 in synchronism with the data stored thereon.

Block 21 designates schematically a pulse-forming network that is responsive to read out tape clock pulses. Thus, the output train furnished by network 21 is indicative directly of the speed of tape 10 as well as the momentary phase position of data stored on tape 10 with reference to readout head 20. As stated above, data readout is to be obtained in strict synchronism and in phase-locked relationship to a local clock-pulse source such as an oscillator. Reference numeral 22 designates such a local oscillator presently furnishing binary output signals at a rate corresponding to 12.5 kilocycles per second (see FIG. 2*a*). The binaries furnished by clock-pulse source 22 are fed to a phase detector 23.

The second input signal for phase detector 23 is being derived as follows. The output of network 21 is fed to an automatic volume-control or gain-control network 24 to assure a constant output level. The output of network 24 is fed to a limiter stage 25, so that at the output side of limiter 25 there appears a series of pulses directly indicative of the speed and phase relationship of tape 10.

The output of limiter 25 is fed to a frequency divider or contour 26 having a number of stages, presently three, denoted as **26*a*, 26*b*, and 26*c* respectively. The three stages each divide an incoming frequency by 2 to 1. There are as many stages less one as there are desired tape speeds. Stages 26*a*, 26*b*, etc., may be comprised of simple flip-flops. The purpose of this frequency divider 26 is to establish at its output terminal 27*b*** a frequency of 12.5 kilocycles per second, regardless of the preselected tape speed.

Frequency divider 26 has a variable and adjustable input terminal governed by a four-position switch **27*a* corresponding to four different tape speeds. It will be appreciated that in case the tape speed is 7½ inches per second, the output of limiter 25 will be connected directly to terminal 27*b*. In case the tape speed is 15 inches per second, one divider stage will be needed so that the pulse train furnished by limiter 25 is subjected to a 2 to 1 frequency division. Accordingly, switch 27*a* will connect the output terminal of limiter 25 to the input side of counter stage 26*a*. In case the actual tape speed is 30 inches per second, two stages are needed, and the overall frequency division is 4 to 1. Accordingly, switch 27*a* will connect the output terminal of limiter 25 to the input side of stage 26*b*. For a tape speed of 60 inches per second, switch 27*a* connects stage 26*c* to limiter 25**, so that the tape clock pulses may be subjected to a frequency division of 8 to 1.

Figures 2A, 2B, 2C, 2D, 2E, 2F, 2G:
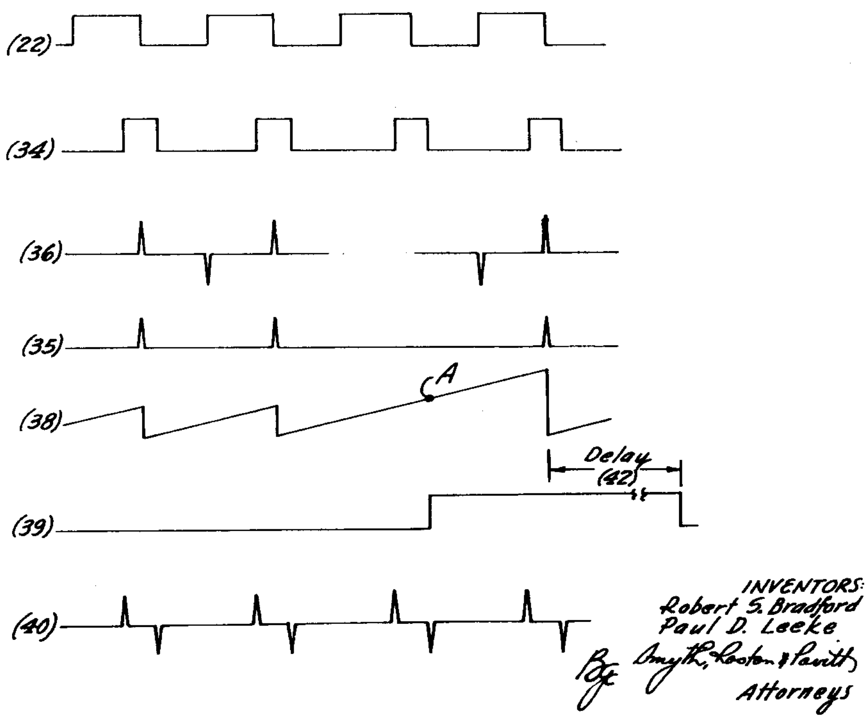

For convenience, it can readily be assumed that, in case of normal operation, FIG. 2*a* also represents the counter output signals developed at terminal **27*b*. The output of counter or divider 26** is the tape binaries. It will be appreciated that the tape clock pulses as well as the tape binaries equally represent the phase and speed of the tape.

It is immaterial in what mode counter 26 is operated. In the illustrated mode, output terminal **27*b* is always connected to the output terminal of one divider stage, and the output signal furnished by limiter 25 is being fed selectively to the input terminals of the first, the second, or the last stage. The other mode of operation includes a permanent connection between stage 26*c* and limiter 25, and the output terminal 27*b* is selectively connected to the output of whatever stage is needed. Thus, in this case, a switch similar to switch 27*a* could govern terminal 27*b***.

The 12.5-kilocycle signal developed in any event at terminal **27*b* is next being fed to the second input terminal of phase detector 23. Accordingly, the phase detector 23 compares the reference binaries with the output of divider 26**.

The output of phase detector 23, which is a D.C. signal, is fed to the above-mentioned control terminal 16, to be super-imposed upon the output of frequency discriminator 15. Hence, the amplifier 17 receives the combined input furnished by discriminator 15 and phase detector 23.

From the foregoing, it will be appreciated that for normal operation the tape position control is attained by a feedback loop which includes the following elements: head 20 for sensing the tape clock pulses, pulse former 21, AVC 24, limiter 25, counter 26 is needed, and phase detector 23 (with reference-pulse source 22) closing the loop through amplifier 17, motor 13, and capstan 11. Phase detector 23 and frequency discriminator 25 both are adjusted so that together they produce a residual output voltage for correct phase and speed so as to maintain a specific normal input voltage for amplifier 17. The resulting output voltage of amplifier 17 suffices to run motor 13, whereby the tape has proper speed and phase relative to the phase and frequency of the reference clock pulses or reference binaries continuously furnished by source 22.

Proceeding now to the dropout "bridging" system, it is an important feature of the present invention that one side of a capacitor 30 is also connected to the control terminal 16. The other side of capacitor 30 is connected through a resistor 31 to ground. The RC circuit network established in this manner has a relatively large time constant. The voltage developed at capacitor 30 is indicative of the average speed and position of tape 10 during normal operation. Thus, the RC circuit 31–30 senses and monitors the average potential at terminal 16, which is directly indicative of the phase and speed of the motor and tape.

As indicated symbolically, capacitor 30 can be connected to ground directly through a normally open switch 32*a*. During normal operation, the voltage established across capacitor 30 averages out deviations developed by discriminator 15 and by phase detector 23. In case the average potential at terminal 16 remains constant, one side of capacitor 30 will be at ground potential. Thus, in any event, as soon as switch 32*a* closes and switch 32*b* opens, the potential at terminal 16 will be arrested to a value that has been previously established by the averaging action of the RC circuit. Particularly, the voltage across the capacitor 30 of this RC circuit now determines the potential of terminal 16. It is, of course, understood that the total impedance between terminal 16 and ground through any of the networks is very large compared with resistor 31.

It has been found that a dropout, i.e., the vanishing of recorded tape clock pulses, follows a statistical distribution in that the missing of one or a few clock bits on the tape is relatively frequent as compared with the missing of a large number of bits from the control track. The invention now is destined to prevent the missing of one or more counts in tape 10 during the most frequently occurring clock-pulse dropout. Since a tape clock-pulse dropout immediately results in a tape binary dropout, the phenomenon will hereinafter always be called "binary dropout." As far as the control of motor 17 is concerned, dropout bridging is attained by closing switch 32*a* immediately upon occurrence of the missing of a speed-adjusted tape binary, and switch 32*a* remains closed throughout the dropout.

It will be recalled that, during normal operation, detector 23 and discriminator 15 establish an average voltage across capacitor 30 which is indicative of the average speed and position of tape 10 during such normal operation. Immediately upon occurrence of a tape-binary dropout, switch 32*a* closes one side of capacitor 30 to ground, so that this capacitor now holds its charge at least for a relatively long period of time. The control of contact blade 32*a* will be described more fully below. After blade 32*a* has closed, motor 13 will be run and position-controlled in accordance with the control voltage previously sensed and averaged at terminal 16; the speed will continue to be controlled by the feedback loop, as established by tachometer 14 and discriminator 15, maintaining the speed of the motor as before. The specific charge of capacitor 30 insures the proper tape position as far as phase relationship is concerned, so that the movement of tape 10 will remain stable for an appreciably long period of time. By an appreciably long period of time, it is meant that the charge of capacitor 30 is to maintain stable phase relationship of tape 10 for those periods of time equivalent to most of the dropout periods.

Proceeding now to the description of the elements that control the dropout "bridging." and particularly contact blade 32*a*, there is first provided a delay generator 33 of conventional design, which produces the delay of the reference binaries, drawn from clock-pulse source 22, by a period of time that is about three-eighths of the oscillation period of the clock-pulse source 22. In the present case, the delay produced will be 37.5 microseconds. At the output side of delay generator 33, a train of pulses now appears which is similar to the train of pulses drawn from reference-binary source 22 (FIG. 2*a*) but is phase shifted by 37.5 microseconds with respect thereto.

The train of output pulses of the delay generator 33 is used periodically to trigger a one-shot pulse generator or monovibrator 34 having an oscillation or recovery time of 5 microseconds. FIG. 2*b* illustrates the train of pulses produced by monovibrator 34.

It appears that each of the output pulses of monovibrator 34 commences 2.5 microseconds prior to the passage of the trailing edge of each undelayed reference binary as delivered by clock-pulse source 22. The duration of the monovibrator output pulse extends beyond passage of the trailing edge of such reference binary to about 2.5 microseconds subsequent thereto. Accordingly, each monovibrator output pulse coincides with the trailing edge of a reference binary and establishes a tolerance of ±2.5 microseconds with respect to this trailing edge.

For purposes of the invention, the output signals furnished by any one of the elements 22, 33, or 34 can be regarded as a train of reference pulses.

During normal control operation, the speed-adjusted tape binaries as appearing at terminal 27*b* are to be phase-locked with respect to the reference binary. Thus, the trailing edge of each speed-adjusted tape binary at terminal 27*b* is likewise to appear at the center of the occurrence of a monovibrator output pulse. Accordingly, the duration of the monovibrator output pulse defines a tolerance range within which the edge of a tape binary has to occur. It should be mentioned that this tolerance range or interval does not reflect any tolerance of phase detection and position control produced by detector 23.

Coincidence of a control pulse from monovibrator 34 and of the trailing edge of a tape binary is being used by and in the coincident "AND" gate 35.

The monovibrator 34 feeds its pulse trains to one input terminal of the "AND" gate 35. The "AND" gate 35 is of the two-input type. A differentiating stage 36 has its input side connected to terminal 27*b* and its output side connected to the second input terminal of "AND" gate 35. Accordingly, "AND" gate 35 responds to a coincidence of the monovibrator output pulse and the differentiated pulse drawn from terminal 27*b*. Coincidence has to occur within the tolerance limit given by the duration of the monovibrator output pulse.

FIG. 2*c* illustrates the pulse train as furnished by differentiating stage 36.

It should be mentioned that the differentiating stage 36 does not have to be unidirectional, for the differentiating pulse resulting from the leading edge of each output pulse at terminal 27*b* is simply to have such a polarity as would not gate or bias the "AND" gate 35 for pulse conduction.

The output signals furnished by "AND" gate 35, in case of a coincidence of a monovibrator output pulse and a differentiated trailing edge pulse of the tape binaries, are shown in FIG. 2*d*. "AND" gate 35 is connected with its output terminal to a pulse shaper 37 producing a more or less rectangular pulse of very short duration and of sufficient amplitude to trigger a reset integrator 38 which is connected to the output side of pulse shaper 37. This reset integrator 38 can also be described as a sawtooth generator, which produces a linearly increasing output voltage for a certain period of time. Upon occurrence of a trigger pulse at the input side, the output voltage drops to zero (discharge of a capacitor), whereupon the output voltage commences again to increase linearly (see FIG. 2*e*). The output of reset integrator 38 is thus a train of sawtooth wave-shaped pulses at a frequency of the "AND" gate output pulses, which, in case of normal operation, is also 12.5 kilocycles.

The reset integrator 38 feeds its output pulses, i.e., its sawtooth-shaped voltage waves, to a Schmitt trigger 39. The response level of Schmitt trigger 39 is biased to such an extent that during normal operation the sawtooth waves furnished by reset integrator 38 are insufficient to trigger the Schmitt trigger 39.

It appears that the Schmitt trigger 39 will not produce any output signal as long as the "AND" gate 35 furnishes output pulses at a rate of 12.5 kilocycles while permitting succeeding pulses to be plus or minus 2.5 microseconds out of phase. Thus, this branch of the control network remains inactive during normal operation.

The pulse diagrams of FIGS. 2*c*, 2*d*, and 2*e* show that a speed-adjusted tape binary is missing. In this case, first one pair of pulses at the output side of the differentiating stage 36 is missing. Thus, one output pulse of the "AND" gate 35 is likewise missing, so that reset integrator 38 is not being reset but continues to furnish its increasing output voltage. At point A, the trigger level of the Schmitt trigger 39 is being reached, and now an output pulse is being furnished by the Schmitt trigger, which output pulse will remain particularly at a constant level as long as the input side thereof is above the trigger level A. Accordingly, and without further provision, the Schmitt trigger 39 will remain in the "ON" state at least as long as no tape binary appears.

The output pulse block furnished by the Schmitt trigger 39 (FIG. 2*f*) is being fed to switches **32*a* and 32*b* respectively for connecting capacitor 30 to ground and for disconnecting the phase detector 23 from control terminal 16. Voltage control at terminal 16 thus becomes arrested and stabilized. The output pulse of Schmitt trigger 39 is also fed to trigger reset delay network 42 having an appropriate delay period, for example, 200 microseconds, whereupon it furnishes the signal for resetting, i.e., for turning off the Schmitt trigger 39**.

The operation of this delay device is that, after the output of reset integrator 38 has exceeded trigger level A, the delay generator 42 insures that Schmitt trigger 39 remains on for 200 microseconds after the output of the reset integrator has dropped below level A. The output of reset integrator 38 will drop to zero after reappearance of a tape binary. The trigger reset delay 42 thus furnishes a voltage which will maintain the Schmitt trigger 39 in the "ON" state for a period of fixed duration, which in the present case may be about 200 microseconds after reappearance of the tape binaries. In other words, Schmitt trigger 39 furnishes its output pulse for a fixed period beyond the dropout.

After the tape clock pulses and the tape binaries have in fact reappeared, it is undesirable to reconnect phase detector 23 immediately to control terminal 16 by closing switch **32*b*. Phase detector 23 must be permitted to stabilize. Only after at least partial stabilization of phase detector 23 has occurred may switch 32*b* be closed and switch 32*a* be opened. This necessary delay as produced by delay generator or network 42** insures smooth change-over from the dropout period to normal operation.

The Schmitt trigger can be turned off only after reset integrator 38 has received another pulse. This, in turn, occurs only if the continuously produced monovibrator pulses have a phase to the output pulses of counter 26 within the tolerance limit given by the width of the monovibrator output pulses. Such coincidence will occur only if there is a reasonable phase relationship between the speed-adjusted tape binary pulses when reappearing at terminal **27*b*** and the reference binaries.

After a relatively short dropout, the position control, as effectively continued by the constant voltage across capacitor 30, insures that the reappearance of the tape binaries will occur within the tolerance limit set by the width of each control pulse furnished by monovibrator 34. Ordinary control operation can thus be resumed without significant phase jump. If a dropout has lasted too long, drifting occurs in the motor and tape control, and there will be no coincidence between these control pulses and the trailing edge of the reappeared tape binaries. In this case, normal operation will not be resumed because, even if the dropout has discontinued, there is still danger that a data count will be missed. If the reappearing tape binaries have their respective trailing edges fall within the tolerance limit of the control pulses, normal operation can be resumed indeed, and the output of reset integrator 38 drops below the Schmitt trigger level. The delay reset network 42 prevents an immediate turning off on the part of switch trigger 39, because delay network 42 furnishes a trigger voltage above the level A to keep Schmitt trigger 39 on for at least 200 microseconds following the first coincidence at gate 35 after dropout. During this tolerance period, the control network will re-establish approximate proper phase relationship as stated, and only after the 200 microseconds covering two additional binary pulses have passed will the output voltage of Schmitt trigger 39 vanish, so that switch 32 is opened again and capacitor 30 is then connected to its high impedance 31.

In the following description, the specific mode employed for resetting counter 26 will be explained. This resetting is important because, after dropout, the counter must not be started by just any first reoccurring tape clock pulse.

The monovibrator 34 additionally feeds its output pulses (FIG. 2*b*) to a differentiating stage 40. The resulting train of differentiated pulses (FIG. 2*g*) is being fed to a reset pulse generator 41 having directional characteristics in that it responds only to the differentiating pulse resulting from the trailing edge of the monovibrator output pulses.

Pulses are fed from reset generator 41 to the reset input terminal of counter or frequency divider 26 upon occurrence of the trailing edge of each control pulse of monovibrator 34. Accordingly, counter 26 is being reset to zero in direct response to the reference binaries drawn from clock-pulse source 22, with the reset pulse occurring 2.5 microseconds after passage of the trailing edge of each reference binary.

One can, therefore, say that the delayed reference binaries are being used to reset the frequency divider or counter 26. Resetting of counter 26 will be entirely independent of proper appearance or nonappearance of tape clock pulses. It is thus assured that after the production of each tape binary, counter 26 will in fact be reset. A primary reason for this provision is that counting can be started immediately upon reappearance of the tape clock pulses after dropout. It is assured additionally that counter 26 is reset in synchronism with the operating frequency of the control network, which, in the present case, is 12.5 kilocycles. This will be developed more fully below.

During a dropout, head 20 may pick up some random signals transferred through elements 21, 24, and 25 and simulating an output pulse initiating counting. However, counter 26 is being reset strictly in synchronism with the reference binaries, so that counting of tape clock pulses can be resumed, always with the counter at zero and not at any arbitrary number. Accordingly, phase detector 23 does not resume its operation after dropout at random, but the resetting of counter 26 thus restricts the range of signals that phase detector 23 may furnish after dropout. Upon reappearance of the tap clock pulses, counter 26 is immediately ready for counting action. Upon such reappearance of the tape clock pulses and the tape binaries, output pulses will be furnished at terminal **27*b* in almost proper phase relationship to the reference binaries, provided that the dropout did not last too long, i.e., provided that the voltage across capacitor 30** maintained the phase of the tape drive with sufficient accuracy.

The fact that, during and after dropout, phase detector 23 will not receive signals which are more or less at random aids in the phase-locking after reappearance of the tape clock pulses. Moreover, the resetting of counter 26 by way of signals derived from the reference binaries insures that the counting process itself is resumed in proper phase relationship.

It may be assumed, for example, that counter 26 operates as a two-stage counter with four tape pulses to be counted for one counter cycle and for the production of one tape binary. During normal operation, the trailing edge of each tape binary may appear between the fourth and fifth tape clock pulses, then between the eighth and ninth tape clock pulses, the next following between the twelfth and thirteenth tape clock pulses, etc. Accordingly, each counting cycle starts with the fifth, ninth, or thirteenth tape clock pulse, i.e., with the $4n+1$ pulse, "$n$" being a positive integer. After dropout, on the one hand, counting is resumed immediately; on the other hand, it is desired that effective counting should follow the previously established phase and pattern for succeeding counting cycles. This is assured in that the counter is being reset before, during and after a dropout at exactly the same rate and phase. After dropout, counter 26 will start to count with the very first tape clock pulse then appearing; but the counter is being reset by a reference binary in between two tape clock pulses, so as to follow the succession of cycles as originally established and continued as if the dropout had not occurred. Thus, effective counting will resume for the production of the first tape binary after a dropout with a tape clock pulse following the original counting pattern, so that the counting then continues in phase synchronism with the counting prior to dropout.

Of course, if the dropout has lasted too long, motor 13 will be subjected to a phase drift—then, of course, requiring extensive control operation, particularly on the part of the phase detector 23. In any event, the resetting of counter 26 by the reference binaries rather than by the counting signals insures that no random signals can become effective in phase detector 23 and that any drifting due to extended dropout still remains within reasonable limits.

The invention is not limited to the embodiments described above, but all changes and modifications thereof not constituting departures from the spirit and scope of the invention are intended to be covered by the following claims.

What is claimed is:

1. In a control system for the speed and position control of a data storage tape, there being a track with synchronizing signals on said tape, which system further includes a feedback-controlled motor driving the tape, there being a control terminal whose potential determines the momentary speed and phase of the motor, the combination comprising:

means responsive to the synchronization signals stored on said tape;
a source of reference signals;
means including delay means connected to said source of reference signals and producing a train of control pulses, each control pulse having a width corresponding to a range of tolerance of position control;
coincidence means responsive to coincidence between a pulse of said train of pulses and an output of said synchronization-signal responsive means; and
means connected to said coincidence means for producing a signal upon a lack of coincidence.

2. In a constant speed control network governing a motor:

a source of clock pulses;
means operatively connected to said motor and producing a train of pulses indicative of phase and speed of said motor;
a frequency divider actuated by said train of pulses and producing a train of counter pulses of a frequency similar to that of said clock pulses;
means for comparing said train of counter pulses with clock pulses for controlling said motor; and
means deriving resetting pulses for said counter from said source of clock pulses.

3. In a control system for the speed and position control of a data storage tape, there being a track with synchronizing signals on said tape, which system further includes a controlled motor driving the tape, there being a control terminal whose potential determines the momentary speed and phase of the motor, the combination comprising:

a source of reference binaries;
means responsive to said reference binaries for producing a train of reference pulses having a width corresponding to a tolerance range;
means responsive to said stored synchronization signals and producing a train of pulses indicative of the phase position of said tape;
control means connected to be responsive to a particular relation between the reference binaries and the pulses of said train for providing to the control terminal a potential for control of the motor;
means connected independently from the control means to be responsive to the coincidence of each pulse of said train of reference pulses and of a pulse of said train of phase indicating pulses and producing a control pulse at least for the duration of absence of such coincidence; and
means connected to be responsive to the control pulse for controlling the potential of said terminal in accordance with the potential existing at the control terminal by operation of the control means prior to occurrence of the control pulse and independently from the potential provided by the control means for the duration of the control pulse.

4. In a control system for the speed and position control of a data storage tape, there being a track with synchronizing signals on said tape, which system further includes a feedback-controlled motor driving the tape, there being a control terminal whose potential determines the momentary speed and phase of the motor, the combination comprising:

a source of reference binaries;
means responsive to the synchronization signals as stored in said tape and producing a train of tape binaries;
counter means actuated by said tape binaries and producing a train of output pulses, said train having a pulse frequency similar to the pulse frequency of said reference binaries; and
means connected to said source of reference binaries for resetting said counter means in synchronism with said reference binaries.

5. In a control system for the speed and position control of a data storage tape, there being a track with synchronizing signals on said tape, which system further includes a feedback-controlled motor driving the tape, there being a control terminal whose potential determines the momentary speed and phase of the motor, the combination comprising:

tape reading means responsive to said stored synchronizing signals;
means connected to said tape reading means for producing a train of pulses of short duration representative of phase and speed of said tape;
a source of reference pulses each having a width corresponding to the position control range;
a coincidence gate comparing occurrence of each of said pulses of said train with the reference pulse and producing an output upon coincidence;

a reset integrator triggered by the output of said coincidence gate;

pulse generating means responsive to the output of said reset integrator and producing an output pulse when the reset integrator output exceeds a predetermined value;

means for sensing the average potential at said control terminal; and means connected to said pulse generator for arresting the potential at said terminal to the average value as determined by said sensing means upon occurrence of said output pulse.

6. In a control system for the speed and position control of a data storage tape, there being a track with synchronizing signals on said tape, which system further includes a feedback-controlled motor driving the tape, there being a control terminal whose potential determines the momentary speed and phase of the motor, the combination comprising:

tape reading means for reading out said stored synchronization signals;

frequency dividing means connected to said tape reading means to be responsive to the readout synchronization signals and producing a train of pulses representative of phase and speed of said tape;

a source of reference pulses each having a width corresponding to the position control range;

means for resetting said frequency divider in response to occurrence of said reference pulses;

an "AND" gate comparing the occurrence of each reference pulse with a phase angle of each pulse of said train of pulses furnished by said frequency divider, and producing a signal upon occurrence of coincidence;

means responsive to the lack of said latter coincidence signal and producing a control pulse having a duration corresponding to the duration of lack of coincidences;

means for sensing the average potential at said control terminal; and means connected to said coincidence means for arresting the potential at said control terminal to the value sensed by said sensing means upon lack of coincidence.

7. In a tape drive mechanism wherein a storage tape is transported by an electric motor, there being a control terminal for the electrical potential determining the speed of said motor, the combination comprising:

means responsive to the signals recorded on a control track of said tape and producing a train of tape binaries;

a source of reference binaries;

a phase detector connected to said signal-responsive means and to said source of reference binaries, for comparing the phase of said train of tape binaries with said train of reference binaries, and feeding a control pulse indicative of any phase deviation to said control terminal;

potential averaging means connected to said control terminal;

means connected to be responsive to the tape binaries independent from the phase detector to detect occurrence of a tape binary a particular period after the actual occurrence of the respective prior tape binary providing a control signal in the absence of such occurrence; and means for arresting the potential at said control terminal to that determined by said averaging means upon occurrence of said control signal due to a dropout of any of said binaries.

8. In a tape-drive mechanism wherein a storage tape with control track is transported by an electric motor, there being a control terminal whose electrical potential determines the speed of said motor, the combination comprising:

a source of reference binaries;

means responsive to the signals recorded on said control track and producing a train of tape clock pulses;

frequency-dividing means connected to be responsive to said train of tape clock pulses and producing a train of tape binaries of a frequency comparable with that of said reference binaries;

a phase detector connected to the output of said frequency divider and to said source of reference binaries for comparing the phase of said train of reference binaries with the train of tape binaries furnished by said frequency divider, and feeding a control pulse to said control terminal indicative of any phase deviation; and means for resetting said frequency divider in response to said reference binaries.

9. In a control system for the speed and position control of a data storage tape, there being a track with synchronizing signals on said tape, which system further includes a motor driving the tape, there being a control terminal whose potential determines the momentary speed and phase of the motor, the combination comprising:

means responsive to the synchronization signals stored on said tape and producing a first train of pulses representative thereof;

a source of reference signals producing a second train of pulses;

means connected to be responsive to a particular relationship between the first and the second train of pulses for controlling the potential of the terminal in response to the particular relationship;

means for determining coincidence of each pulse of said first train with a pulse of said second train within a tolerance limit and producing an output signal upon lack of coincidence;

means for monitoring said output signal and producing a switching signal in response thereto;

means for sensing the average potential at said control terminal; and means connected to said monitoring means for arresting the potential at said terminal as determined by said sensing means for the duration of lack of coincidence in response to said switching signal.

10. In a control system for the speed and position control of a data storage tape, there being a track with synchronizing signals on said tape, which system further includes a feedback-controlled motor driving the tape, there being a cotnrol terminal whose potential determines the momentary speed and phase of the motor, the combination comprising:

means responsive to the synchronization signals stored on said tape and producing a first train of pulses representative thereof;

a source of reference signals producing a second train of pulses;

means for determining coincidence of each pulse of said first train with a pulse of said second train within a tolerance limit and producing an output signal upon lack of coincidence;

means for monitoring said output signal and producing a switching signal in response thereto;

means for sensing the average potential at said control terminal;

means for maintaining said swtiching signal for a predetermined period beyond that of lack of coincidence; and means connected to said monitoring means for arresting the potential at said terminal as determined by said sensing means for the duration of lack of coincidence in response to said switching signal.

11. In a tape-drive mechanism wherein a storage tape with control track is transported by an electric motor, there being a control terminal whose electrical potential determines the speed of said motor, the combination comprising:

a source of reference binaries;
means responsive to the signals recorded on said control track and producing a train of tape clock pulses;
frequency-dividing means connected to be responsive to said train of tape clock pulses and producing a train of tape binaries of a frequency comparable with that of said reference binaries;
a phase detector connected to the output of said frequency divider and to said source of reference binaries for comparing the phase of said train of reference binaries with said tape binaries, and feeding a control pulse to said control terminal indicative of any phase deviation;
means for delaying said reference binaries and producing a train of resetting pulses, each occurring at a fixed time after each reference binary; and
means for resetting said frequency divider in response to said delayed resetting pulses.

12. In a control system for the speed and position control of a data storage tape, there being a track with synchronizing signals on said tape, which system further includes a feedback-controlled motor driving the tape, there being a control terminal whose potential determines the momentary speed and phase of the motor, the combination comprising:
a source of reference binaries;
means responsive to the synchronization signals as stored in said tape and producing a train of tape binaries;
delaying means for delaying each reference binary;
a pulse generator triggered by said delayed reference binaries;
means for determining coincidence between each output pulse of said pulse generator and a phase angle of each tape binary;
means for sensing the average potential at said control terminal; and
means connected to said coincidence means for arresting the potential at said terminal as determined by said sensing means upon lack of coincidence.

13. In a control system for the speed and position control of a data storage tape, there being a track with synchronizing signals on said tape, which system further includes a feedback-controlled motor driving the tape, there being a control terminal whose potential determines the momentary speed and phase of the motor, the combination comprising:
a source of reference binaries;
means responsive to the synchronization signals as stored in said tape and producing a train of tape clock pulses;
delaying means for delaying each reference binary;
a pulse generator triggered by said delayed reference binaries;
counter means actuated by said tape clock pulses and producing a train of tape binaries, said train of tape binaries having a pulse frequency similar to the pulse frequency of said reference binaries; and
means connected to said pulse generator for resetting said counter means.

14. In a control system for the speed and position control of a data storage tape, there being a track with synchronizing signals on said tape, which system further includes a feedback-controlled motor driving the tape, there being a control terminal whose potential determines the momentary speed and phase of the motor, the combination comprising:
a source of reference binaries;
means responsive to the synchronization signals as stored in said tape and producing a train of tape binaries;
delaying means for delaying each reference binary;
a pulse generator triggered by said delayed reference binaries;
means for differentiating said tape binaries;
means for determining coincidence between each output pulse of said pulse generator and the differentiation pulse representing an edge of each tape binary;
means for sensing the average potential at said control terminal; and
means connected to said coincidence means for arresting the potential at said terminal as determined by said sensing means upon lack of coincidence.

15. In a control system for the speed and position control of a data storage tape, there being a track with synchronizing signals on said tape, which system further includes a feedback-controlled motor driving the tape, there being a control terminal whose potential determines the momentary speed and phase of the motor, the combination comprising:
an RC circuit connected between a source of fixed potential and said control terminal;
a normally open switching means for shunting the resistance of said RC circuit;
means for providing reference signals;
means connected to be responsive to the reference signals and being further responsive to the synchronizing signals stored on the tape and providing to the control terminal a potential depending on the reference and synchronizing signals;
coincidence means responsive to the occurrence of said synchronization signals and said reference signals and for producing an output signal upon lack of coincidence; and
means for governing said switching means in response to said output signal.

16. In a tape drive mechanism wherein a storage tape is transported by an electric motor, there being a control terminal for the electrical potential determining the speed of said motor, the combination comprising:
means responsive to the signals recorded on a control track of said tape and producing a train of tape binaries;
a source of reference binaries;
a phase detector connected to said signal-responsive means and to said source of reference binaries, for comparing the phase of said train of tape binaries with said train of reference binaries, and feeding a control pulse indicative of any phase deviation to said control terminal;
an RC circuit connected between a source of fixed potential and said control terminal;
a normally open switching means for shunting the resistance of said RC circuit;
coincidence means responsive to the occurrence of said reference binaries and said tape binaries and for producing an output signal upon lack of coincidence; and
means for governing said switching means in response to said output signal.

17. In a control system for the speed and position control of a data storage medium, there being a track with recorded synchronizing signals on the medium, the combination comprising:
first means responsive to the recorded synchronizing signals and producing a first train of pulses representative thereof;
second means for providing a second train of pulses;
driving means coupled to the medium for moving the medium and having a control terminal the potential of which determining the speed and phase of the medium as driven by the driving means;
first control means connected to the first and second means and to the control terminal for providing to the control terminal a potential representative of the phase between the pulses of the first and second trains;
second control means connected to the first and second means independent from the first control means for detecting the occurrence or nonoccurrence of each pulse of the first train in particular relation to a corresponding pulse of the second train and providing a control signal in the absence of such occurrence; and third control means connected to be responsive to the control signal for causing the potential of the control terminal to be maintained and inhibiting the first control means from varying the potential at least until the second control means detects again said occurrence.

18. A control system for controlling the speed and position of a data storage medium, there being a track on the storage medium on which are recorded signals usable as synchronizing signals representing progressing positions of the medium, comprising:

first mean for providing a train of reference signals;

second means coupled to the track on the medium for providing a train of synchronizing signals;

driving means coupled to the medium for moving the medium;

first control means coupled to the driving means for controlling the speed thereof and further connected to the first and second means for obtaining speed control of the drive means in response to a characteristic relation between the reference signals and the synchronizing signals; and second control means connected to the first and second means for progressively detecting occurrence of each of the synchronizing signal of the train or synchronizing signals in particular, timed relation to a reference signal of the train of reference signals, and being coupled to the driving means for controlling the speed thereof in the absence of such an occurrence thereby overriding the control of the driving means by the first control means.

19. A control system for controlling the speed and position of the data storage medium, there being a track on the storage medium on which are recorded signals usable as synchronizing signals representing the progressing positions of the medium, comprising:

driving means coupled to the medium for moving the medium;

first means for providing a train of reference signals;

second means coupled to the track of the medium for providing a train of synchronizing signals during movement of the medium;

first control means including an input for receiving signals and being coupled to the driving means for controlling the driving means in response to the signals applied to the input;

second control means connected to the first and second means for providing first control signals in response to a characteristic relation between the reference signals and the synchronizing signals, and feeding the first control signals to the input;

third control means connected to the first and second means independently and from the second control means for individually and progressively detecting occurrence of a synchronizing pulse of the train of synchronizing pulses in particular relation to a reference signal of the train of reference signals and providing a second control signal in the absence of such occurrence; and fourth control means connected for monitoring the first control signals and being further responsive to the second control signals for applying to the input during occurrence of the second control signal the level of the first control signal as it existed prior to occurrence of the second control signal and independently from the development of the first control signal during the second control signal by the second control means.

20. In a control system as set forth in claim 19 including means for maintaining the second control signal for a particular period after the third control means has detected reoccurrence of a synchronizing signal in the particular relation to a reference signal.

21. A control system for controlling the speed and position of a data storage medium, there being a track on the storage medium on which are recorded signals usable as synchronizing signals representing progressing positions of the medium, comprising:

first means for providing a train of reference signals;

second means coupled to the track on the medium for providing a train of synchronizing signals;

driving means coupled to the medium for moving the medium;

first control means coupled to the driving means for controlling the speed thereof and further connected to the first and second means for obtaining speed control of the drive means in response to a characteristic relation between the reference signals and the synchronizing signals;

second control means connected to be responsive to the train of synchronizing signals and providing a control signal when, after a particular period succeeding the appearance of a synchronizing signal, another synchronizing signal fails to appear; and third control means coupled to the driving means and being responsive to the control signal for controlling the drive means in accordance with a particular characteristic independently from the first control means for the duration of the control signal.

22. A control system for controlling the speed and position of a data storage medium, there being a track on the storage medium on which are recorded signals usable as synchronizing signals representing progressing positions of the medium, comprising:

first means for providing a train of reference signals;

second means coupled to the track on the medium for providing a train of reproduced reference signals;

third means including a resettable counter responsive to the reproduced reference signals for providing a train of synchronizing signals respectively representative of completed counting of a predetermined number of reference signals;

fourth means connected to the first and third means for resetting the counter in response to said reference signals;

driving means coupled to the medium for moving the medium;

first control means coupled to the driving means for controlling the speed thereof and further connected to the first and third means for obtaining speed control of the drive means in response to a characteristic relation between the reference signals and the synchronizing signals;

second control means connected to be responsive to the train of synchronizing signals and poviding a control signal when, after a particular period succeeding the appearance of a synchronizing signal, another synchronizing signal fails to appear; and third control means coupled to the driving means and being responsive to the control signal for controlling the drive means in accordance with a particular characteristic independently from the first control means for the duration of the control signal.

References Cited

UNITED STATES PATENTS

| | | | |
|---|---|---|---|
| 2,816,257 | 12/1957 | Burdorf | 318—318 |
| 2,886,757 | 5/1959 | Johnson | 318—318 |
| 3,110,853 | 11/1963 | Jones | 318—318 |
| 3,229,270 | 1/1966 | Rosenblatt | 318—19 |

ORIS L. RADER, *Primary Examiner.*

J. J. BAKER, *Assistant Examiner.*